(12) United States Patent
Lagares Corominas

(10) Patent No.: US 9,636,610 B2
(45) Date of Patent: May 2, 2017

(54) BRINE FILTERING DEVICE, APPLIED TO A MEAT PRODUCT INJECTION MACHINE

(71) Applicant: Metalquímia, S.A., Girona (ES)

(72) Inventor: Narcis Lagares Corominas, Girona (ES)

(73) Assignee: METALQUIMA, S.A., Girona (ES)

( * ) Notice: Subject to any disclaimer, the term of this patent is extended or adjusted under 35 U.S.C. 154(b) by 0 days.

(21) Appl. No.: 14/847,147

(22) Filed: Sep. 8, 2015

(65) Prior Publication Data

US 2015/0375146 A1    Dec. 31, 2015

Related U.S. Application Data

(63) Continuation-in-part of application No. 13/284,397, filed on Oct. 28, 2011, now abandoned, which is a (Continued)

(30) Foreign Application Priority Data

May 7, 2010    (EP) .................................... 10380068

(51) Int. Cl.
| | |
|---|---|
| *B01D 33/42* | (2006.01) |
| *B01D 33/073* | (2006.01) |
| *B01D 33/41* | (2006.01) |
| *B01D 33/74* | (2006.01) |
| *B01D 33/11* | (2006.01) |
| *B01D 33/46* | (2006.01) |
| *A23L 13/70* | (2016.01) |

(52) U.S. Cl.
CPC .............. *B01D 33/42* (2013.01); *A23L 13/72* (2016.08); *B01D 33/073* (2013.01); *B01D 33/11* (2013.01); *B01D 33/41* (2013.01); *B01D 33/466* (2013.01); *A23V 2002/00* (2013.01); *B01D 33/74* (2013.01)

(58) Field of Classification Search
None
See application file for complete search history.

(56) References Cited

U.S. PATENT DOCUMENTS

| | | |
|---|---|---|
| 2,899,068 A | 8/1959 | King et al. |
| 3,510,002 A | 5/1970 | Evans |

(Continued)

FOREIGN PATENT DOCUMENTS

| | | |
|---|---|---|
| DE | 25 05 565 A1 | 8/1976 |
| EP | 1 275 305 A1 | 1/2003 |
| ES | 2015398 | 8/1990 |

*Primary Examiner* — Dirk Bass
*Assistant Examiner* — Jonathan Peo
(74) *Attorney, Agent, or Firm* — RatnerPrestia

(57) ABSTRACT

The brine filtering device includes a pre-filtering unit having first and second pre-filtration drums arranged to rotate coaxially about a horizontal axis and a safety filtering unit having a safety filter sleeve submerged in a tank and connected to an outlet. The first and second pre-filtration drums have their lower regions submerged in brine contained in a tub. An inlet hopper receives brine to be filtered and forces it into the first pre-filtration drum through an upper region of its filtering wall. Brine exits a lower region of the first pre-filtration drum and is collected in the tub. Brine enters into the second pre-filtration drum through a lower region of its filtering wall. Brine is poured into tank through an open side wall of the second pre-filtration drum.

19 Claims, 8 Drawing Sheets

Related U.S. Application Data continuation-in-part of application No. PCT/IB2011/000400, filed on Feb. 25, 2011.

(56) References Cited

U.S. PATENT DOCUMENTS

| | | | |
|---|---|---|---|
| 3,679,035 A * | 7/1972 | Schmitt | B01D 33/067 192/129 A |
| 4,354,931 A | 10/1982 | Allori et al. | |
| 4,836,917 A | 6/1989 | Tomita et al. | |
| 5,213,685 A | 5/1993 | Padovan | |
| 6,227,379 B1 | 5/2001 | Nesseth | |
| 2003/0089655 A1 | 5/2003 | Lagares Corominas | |
| 2006/0180533 A1 | 8/2006 | Cummins | |

* cited by examiner

BRINE FILTERING DEVICE, APPLIED TO A MEAT PRODUCT INJECTION MACHINE

CROSS REFERENCE TO RELATED APPLICATIONS

This application is a Continuation-in-Part of U.S. patent application Ser. No. 13/284,397, filed Oct. 28, 2011, which is Continuation-in-Part of PCT/IB2011/00400, filed Feb. 25, 2011, which claims priority to European Patent Application No. 10380068, filed May 7, 2010, the contents of such applications being incorporated by reference herein.

TECHNICAL FIELD

The present invention relates to a brine filtering device, applicable to an injection machine used to inject brine in pieces of meat product. The filtering device is used to filter the brine that is supplied to the injection machine as well as the surplus brine from the injection process, which is again recycled towards the injection machine during the operation thereof.

The proposed filtering device can be used for other machines which require precise filtering of brine to be used in a later step.

BACKGROUND OF THE INVENTION

Patent ES-A-2015398 discloses fluid substance recycling and filtering equipment applicable to a meat mass injection machine. The filtering and recycling equipment comprises a pre-filtering unit with a pre-filtration drum arranged to rotate about a horizontal rotation axis and provided with a filtering wall around said horizontal rotation axis, and a safety filtering unit with a safety filtering drum arranged to rotate coaxially together with the pre-filtration drum and provided with a corresponding filtering wall around the horizontal rotation axis.

The brine from the injection machine is poured over an upper region of the pre-filtration drum such that it penetrates into same by gravity through its filtering wall, and exits the pre-filtration drum through an open side wall thereof. The pre-filtered brine is collected in a tub. The safety filtering drum is arranged such that its filtering wall rotates partially submerged in the pre-filtered brine contained in the tub.

The brine of the tub enters into the safety filtering drum through open side walls thereof. The tub has an outlet located below and very close to a lower region of the filtering wall of the safety filtering drum, and the brine is forced out of the safety filtering drum through its filtering wall and through the outlet by suction means. In the upper region of the safety filtering drum there is an automatic cleaning device which uses outside to inside pressurized water jets through the filtering wall.

Patent EP-A-1275305 describes a filtering apparatus applicable to a meat materials injection machine, comprising a pre-filtering unit with a pre-filtration drum arranged to rotate about a horizontal rotation axis and provided with a filtering wall around said horizontal rotation axis, and a safety filtering unit with a pair of safety filtering sleeves horizontally submerged in a tank. The brine from the injection machine is poured over an upper region of the pre-filtration drum such that it penetrates into same by gravity through its filtering wall, and exits the pre-filtration drum through open side walls thereof and through a lower region of the filtering wall. The pre-filtered brine is collected and poured into the mentioned tank inside which the safety filtering sleeves are located. The safety filtering sleeves are connected to an outlet and the brine is forced into the safety filtering sleeves through their filtering wall and through the outlet by suction means.

The safety filtering sleeves can independently pivot towards a straight position emerging from the brine for cleaning and maintenance tasks. A valve device allows operating alternately by means of one of the safety filtering sleeves while the other one is subjected to the cleaning and maintenance operations.

It has been observed that a single pre-filtration drum in the pre-filtering unit may not be enough to provide efficient pre-filtering of the brine from the injection machine, which can still incorporate particles or small pieces of meat mixed therewith, and this results in a higher amount of particles retained by the filtering wall of the safety filter, with the risk of obstruction and the need to perform the cleaning and maintenance operations more frequently.

Document DE-A-2505565 discloses a method for separating suspended material from water using a revolving drum having a microsieve filtering wall. The aqueous suspension is applied onto the outer face of the drum filtering wall, the separated material is then loosened from the drum filtering wall by a water jet from a nozzle directed onto the inner face of the drum filtering wall, and the separated material then flows onto a scraper blade bearing against the outer face of the drum. In a variant, the process is carried out in two stages: first the suspension is applied onto the inner face of a coarse drum with the washing jets on the outside, and then the liquid from this first stage is applied onto the outer face of a microsieve drum with the washing jets on the inside, as in the first variant.

A drawback with the cited DE-A-2505565 is that the use of water jets for washing the drum filtering wall makes unfeasible using the device for filtering brine because the water from the water jets will mix with the brine and will dilute the brine.

DISCLOSURE OF THE INVENTION

The present invention contributes to overcoming the aforementioned drawback by providing a brine filtering device, applicable to a meat product injection machine, integrating a pre-filtering unit and one or more safety filtering units to assure that the particles in the brine filtered by said units do not exceed a pre-determined size. According to the invention, the pre-filtering unit comprises at least first and second pre-filtration drums arranged to rotate coaxially together about a horizontal rotation axis and provided with respective first and second filtering walls around said horizontal rotation axis, and an inlet hopper configured to receive brine to be filtered and to force it into said first pre-filtration drum through said first filtering wall in an upper region thereof. A tub is arranged below the first and second filtration drums to collect the brine filtered through the first filtering wall, which exits a lower region of the first pre-filtration drum. During operation, a lower region of both first and second pre-filtration drums located below the horizontal rotation axis is submerged in the brine contained in the tub.

The brine pre-filtered by the first pre-filtration drum passes from the mentioned collection tub into said second pre-filtration drum through the second cylindrical filtering wall in a lower region thereof and is poured from inside the second pre-filtration drum into a tank through an open side wall of the second pre-filtration drum. The safety filtering unit comprises at least one safety filter sleeve submerged in said tank. The safety filter sleeve is connected to an outlet of the tank and suction means are provided to suck the brine contained in the tank through a filtering wall of the safety filter sleeve and said outlet.

The brine is thus first passed through the first filtering wall from outside to inside the first pre-filtration drum, then it is passed through the second filtering wall from outside to inside the second pre-filtration drum, and finally it is passed through the filtering wall of the safety filter sleeve before being directed towards the outlet. The first and second filtering walls of the first and second pre-filtration drums can have the same mesh size, or the second filtering wall can have a smaller or larger mesh size than that of the first filtering wall. The filtering wall of the safety filter sleeve will have a mesh size that is smaller than or equal to that of the first and second filtering walls of the first and second pre-filtration drums.

The pre-filtered brine can pass from inside the first pre-filtration drum to the tub through the lower region of the corresponding first filtering wall and furthermore through completely or partially open side walls arranged at opposite ends of the first pre-filtration drum. The second pre-filtration drum has a closed side wall at the end thereof adjacent to the first pre-filtration drum and the mentioned open side wall at the other end thereof adjacent to the tank of the safety filtering unit. The end of the tub adjacent to the open side wall of the second pre-filtration drum is sealed by dynamic sealing means arranged between the tub and the second pre-filtration drum, such that the brine can only enter the second pre-filtration drum through the lower region of its cylindrical filtering wall submerged in the brine of the tub.

The mentioned dynamic sealing means are provided, in one embodiment, by a perimetric flange extending radially outwards from one end of the second pre-filtration drum adjacent the tank in cooperation with a curved channel closing one end of the tub. The curved channel has opposite ends located at an upper level than the level of brine in the tub and an intermediate region located at a lower level than the level of brine in the tub. A lower region of the perimetric flange is fitted in the curved channel so that friction between outer surfaces of the perimetric flange and inner surfaces of the curved channel provides a seal either when the second pre-filtration drum is stopped and when the second pre-filtration drum rotates. The tank is in communication with the tub through the open side wall of the second pre-filtration. As a result, brine flows or is poured from inside the second pre-filtration drum into the tank of the safety filtering unit through the open side wall of the second pre-filtration drum and over said intermediate region of the curved channel.

The pre-filtered brine exiting the second pre-filtration drum through its open side wall can optionally be passed through one or more additional filtering drums before being poured into the tank of the safety filtering unit. To that end, in one embodiment the pre-filtering unit comprises at least one third additional pre-filtration drum arranged to rotate coaxially together with the first and second filtration drums, and provided with an additional filtering wall around the horizontal rotation axis. The tub in turn comprises at least one additional compartment separated from the tub by the dynamic sealing means arranged between the tub and the second pre-filtration drum. This additional compartment of the tub thus receives the pre-filtered brine poured from the open side wall of the second pre-filtration drum.

The additional pre-filtration drum has a closed side wall at an end adjacent to the second pre-filtration drum and an open side wall adjacent to the tank of the safety filtering unit. Additional dynamic sealing means are arranged between the additional compartment of the tub and an end of the additional pre-filtration drum adjacent to said open side wall thereof. The pre-filtered brine is thus forced from the additional compartment of the tub into the additional pre-filtration drum through a lower region of the additional filtering wall and is poured from inside the additional pre-filtration drum into the tank of the safety filtering unit through the mentioned open side wall of the additional pre-filtration drum. Similarly, the pre-filtering unit can include several additional pre-filtration drums.

In one embodiment, the safety filtering unit comprises at least two of the mentioned safety filtering sleeves connected to said outlet through respective independent valve devices, according to technique that is known through the mentioned documents. Each of said valve devices has a mobile body connected to a support on which the corresponding safety filter sleeve is installed. The valve device is operated by a pivoting movement of said support between a working position, in which the safety filter sleeve is submerged in the brine in the tank and the corresponding valve device is open and a cleaning and maintenance position, in which the safety filter sleeve is emerged from the brine of the tank and the corresponding valve device is closed.

Thus, the filtering device can operate with one of the safety filtering sleeves the support of which is arranged in the working position while the support of another safety filtering sleeve can be in the cleaning and maintenance position, allowing the extraction of the corresponding safety filter sleeve for its cleaning, maintenance or replacement. To that end, each safety filter sleeve is fixed to its corresponding support by fixing means that can be easily released manually without needing tools, for example by means of a simple snap-fitting, allowing an extraction and placement of the safety filter sleeve by axially sliding it along the support.

Each of the supports of the safety filtering sleeves comprises a body which extends internally along the corresponding safety filter sleeve and there is formed in this body an inner conduit communicated with the outlet through the valve device and having one or more inlets intentionally located to be above the level of the brine in the tank when the support is in the cleaning and maintenance position. Thus, the safety filter sleeve can be extracted by axially sliding it along the support without the risk of the brine penetrating towards the valve device when the support is in the cleaning and maintenance position.

In one embodiment, the inlet hopper is associated with a retaining member having a contact edge positioned over an outer surface of the first filtering wall of the first pre-filtration drum at an upper region thereof. This retaining member is movably arranged and during rotation of the first pre-filtration drum is driven by a driving mechanism to intermittently move between a retaining position, in which the contact edge of the retaining member is supported by gravity on the outer surface of the first filtering wall of the first pre-filtration drum, and a release position, in which the retaining member is out of contact with the first filtering wall of the first pre-filtration drum 1. Preferable, in the course of each turn of the first pre-filtration drum the retaining member is moved only once from the retaining position to the release position and again to the retaining position, and the time during which the retaining member is in the retaining position is longer, for example from 8 to 10 times longer than the time during which the retaining member is in the release position.

During rotation of the first pre-filtration drum and while the retaining member is in the retaining position, both waste, such as small pieces of meat and other undesired particles mixed with the brine being filtered, and components of brine, such as salt lumps, are momentarily retained and accumulated on the upper region of the first filtering wall of the first pre-filtration drum by the retaining member, and this lets time for said components of brine to dilute and pass through the first filtering wall of the first pre-filtration drum by gravity and return to the brine in the tub while the waste remains momentarily retained by the retaining member.

When the driving mechanism moves the retaining member to the release position for a relatively short time, the waste which was momentarily retained and accumulated by the retaining member is moved by the first pre-filtration drum and passes under the retaining member to the first scraper and to the collection tray.

This way, the waste disposed is substantially free of components of brine since the components of brine are already diluted and have passed through the first filtering wall of the first pre-filtration drum, which leads to a reduction in the consumption of components of brine, a reduction in the amount of waste to be disposed, and a reduction in operation costs.

BRIEF DESCRIPTION OF THE DRAWINGS

The previous and other features and advantages will be more fully understood from the following detailed description of several embodiments with reference to the attached drawings, in which.

DETAILED DESCRIPTION OF EXEMPLARY EMBODIMENTS

Figure 1:
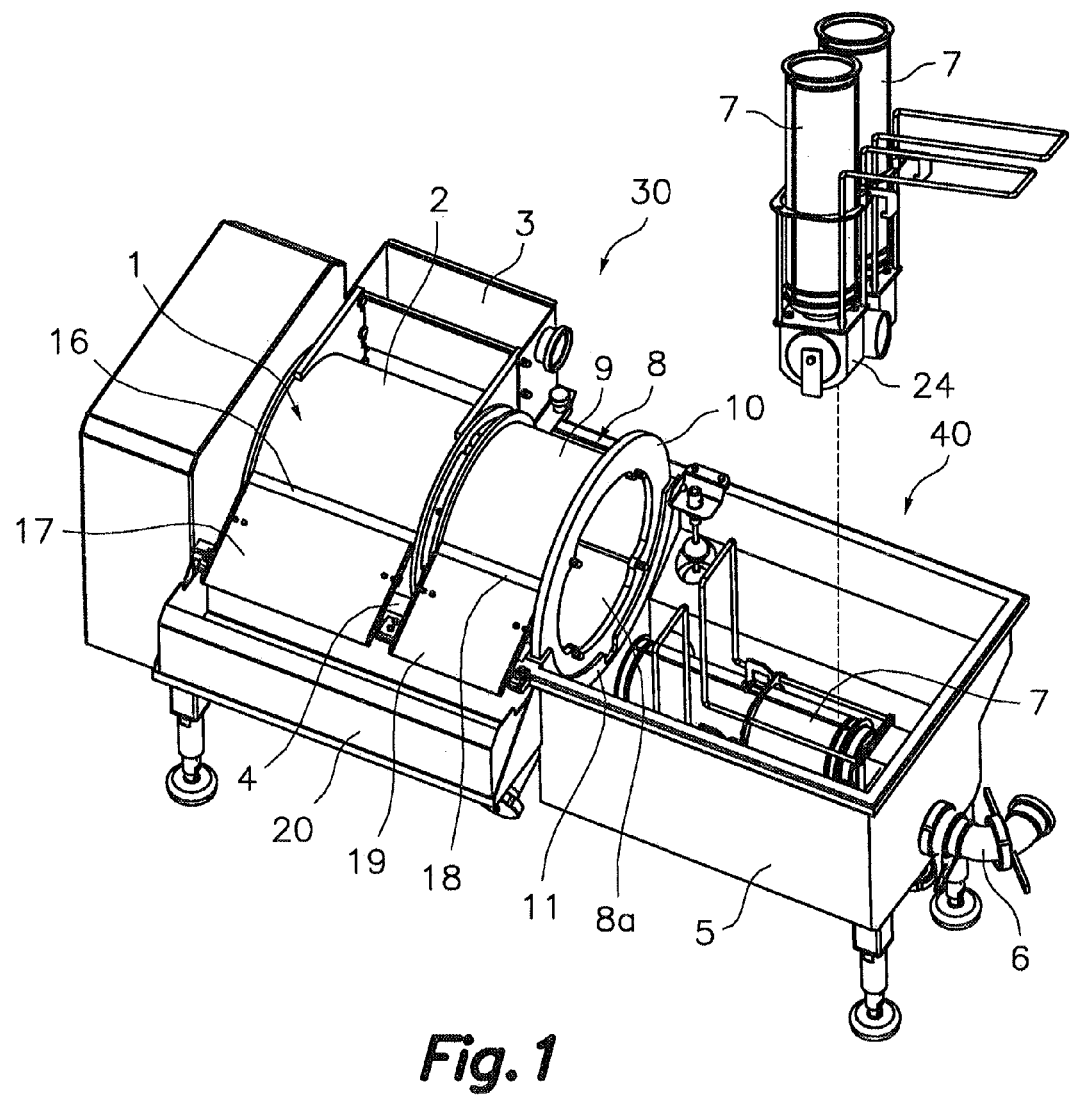
FIG. 1 is a perspective view of a brine filtering device according to an embodiment of the present invention, with a group of elements of a safety filtering unit shown in a working position and also separated from the device.

FIGS. 1 to 4 show a brine filtering device according to an embodiment of the present invention, which is applicable to a meat product injection machine. The brine filtering device comprises a pre-filtering unit 30 and a safety filtering unit 40. The pre-filtering unit 30 comprises a first pre-filtration drum 1 and a second pre-filtration drum 8 arranged to rotate together about a horizontal rotation axis.

A motor 33 (schematically shown in dashed lines in FIG. 4) is arranged inside a protecting cabinet 34 and has an output shaft operatively connected to drive the first pre-filtration drum 1, while the second pre-filtration drum 8 is coaxially attached to the first pre-filtration drum 1 by bolts 41 for rotating therewith.

The first pre-filtration drum 1 is provided with a first filtering wall 2 arranged around said horizontal rotation axis and opposite open side walls 1a, 1b. The second pre-filtration drum 8 is provided with a second filtering wall 9 arranged around the horizontal rotation axis, a closed side wall 8b adjacent the first pre-filtration drum 1 and an opposite open side wall 8a adjacent said safety filtering unit 40. The second pre-filtration drum 8 further comprises a perimetric flange 10 extending radially outwards from one end thereof adjacent to said open side wall 8a.

Both the first pre-filtration drum 1 and the second pre-filtration drum 8, which in this embodiment have substantially the same outer diameter, have at least a lower region of their respective first filtering wall 2 and second filtering wall 9 located within a tub 4 and submerged in brine contained in the tub 4. The tub 4 has in a lower region thereof a drainage outlet 23 closed by a drain plug 22. The safety filtering unit 40 comprises a tank 5 having a side wall 5a adjacent to the tub 4.

An inlet hopper 3 is arranged on an upper region of the first pre-filtration drum 1. Said inlet hopper 3 is configured to receive brine to be filtered and to force it by gravity into said first pre-filtration drum 1 through said first filtering wall 2 at an upper region thereof. The brine pre-filtered through the first filtering wall 2, exits the first pre-filtration drum 1 through a lower region of the first filtering wall 2 and through the open side walls 1a, 1b thereof, and is collected in the tub 4.

A first scraper 16 is arranged to scrape an outer surface of the first filtering wall 2 of the first pre-filtration drum 1 and a first ramp 17 is arranged to direct waste pulled off by said first scraper 16 to a collection tray 20, and a second scraper 18 is arranged to scrape an outer surface of the second filtering wall 9 of the second pre-filtration drum 8 and a second ramp 19 is arranged to direct waste pulled off by said second scraper 18 to the collection tray 20.

The safety filtering unit 40 comprises one or more safety filter sleeves 7 located within said tank 5. In use, the safety filter sleeves 7 are submerged in brine contained in the tank 5 and are connected to an outlet 6 of said tank 5, and suction means, such a suction pump actuated by a motor, are provided for sucking the brine contained in the tank 5 through said safety filter sleeve 7 and through said outlet 6.

Figure 11:
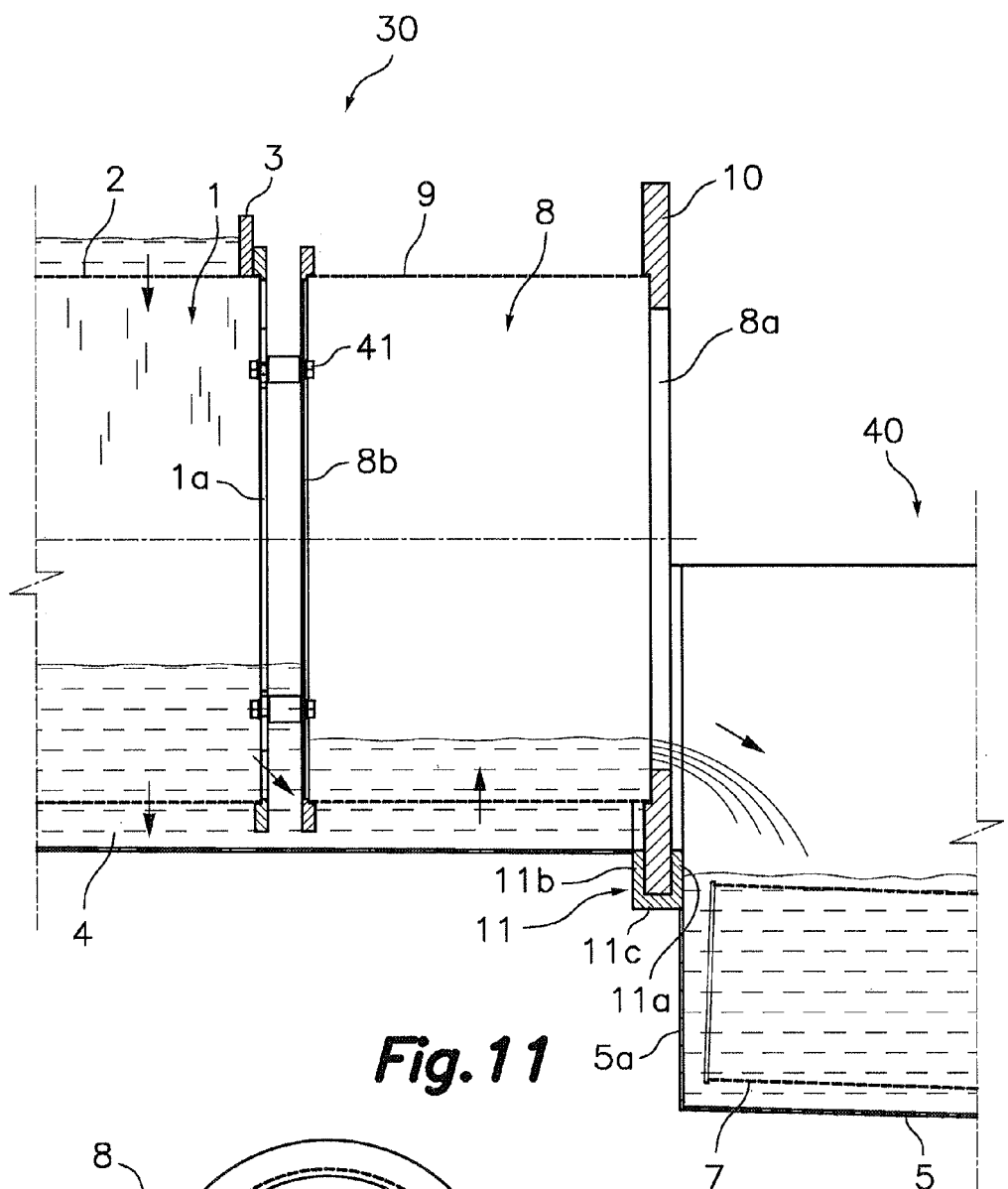
FIG. 11 is a partial schematic sectional side view illustrating dynamic sealing means arranged between a tub and a second pre-filtration drum brine pertaining to the filtering device according to either embodiment of the present invention.
Figure 12:
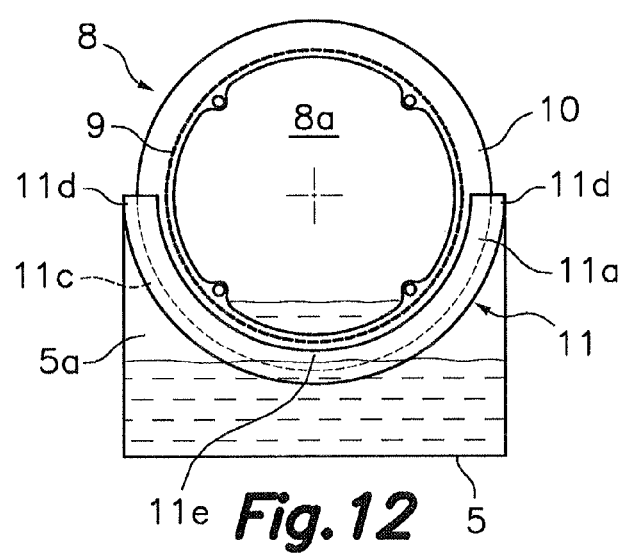
FIG. 12 is a partial schematic sectional front view illustrating the dynamic sealing means.

As better shown in FIGS. 11 and 12, one end of the tub 4 adjacent the open side wall 8a of the second pre-filtration drum 8 is provided with a curved channel 11 and the side wall 5*a* of the tank 5 is attached to this end of the tub 4. The mentioned side wall 5*a* of the tank 5 has an aperture in communication with the tub 4. Said aperture has a curved edge, and the curved channel 11 is attached to the side wall 5*a* of the tank 5 along said curved edge of the aperture. The curved channel 11 is coaxial with the horizontal rotation axis, and has opposite ends 11*d* located at an upper level than the level of brine in the tub 4 and an intermediate region 11*e* located at a lower level than the level of brine in the tub 4 (see FIG. 12).

The curved channel 11 has opposite side walls 11*a*, 11*b* and a bottom wall 11*c*, and a lower region of said perimetric flange 10 of the second pre-filtration drum 8 is inserted with a relatively tight fit in the curved channel 11 (see FIG. 11). The curved channel 11 is preferably made of a low friction material, such a low friction plastic, thereby permitting rotation of the perimetric flange 10 and thus rotation of the first and second pre-filtration drums 1, 8. Friction between inner surfaces of the opposite side walls 11*a*, 11*b* and bottom wall 11*c* of the curved channel 11 and outer surfaces of the perimetric flange 10 provides a dynamic seal between a region of the tub 4 outside the second filtering wall 9 of the second pre-filtration drum 8 and the tank 5, as well as a bearing for the joint rotation of the first and second pre-filtration drums 1, 8 at the end thereof adjacent the tank 5. Therefore, fluid communication between the tub 4 and the tank 5 is only possible through the open side wall 8*a* of the second pre-filtration drum 8.

With this arrangement, pre-filtered brine coming from the first pre-filtration drum 1 and collected in the tub 4 enters the second pre-filtration drum 8 through a lower region of the second filtering wall 9 thereof by hydrostatic pressure, and pre-filtered brine from the second pre-filtration drum 8 is poured through the open side wall 8*a* thereof and over the intermediate region 11*e* of the curved channel 11 into the tank 5. Then, the pre-filtered brine in the tank 5 enters the safety filter sleeves 7 and finally filtered brine exits the tank 5 through the safety filter sleeves 7 and the outlet 6.

The term "open side wall" is used to refer to a side wall having one or more apertures or made of a material configured to allow the passage of the pre-filtered brine therethrough. For example, the open side walls 1*a*, 1*b* provided at opposite ends of the first pre-filtration drum 1 are configured to allow the passage of the pre-filtered brine from inside the first pre-filtration drum 1 towards the tub 4. Alternatively, only one of the opposite side walls of the first pre-filtration drum 1 is an open side wall.

Figure 3:
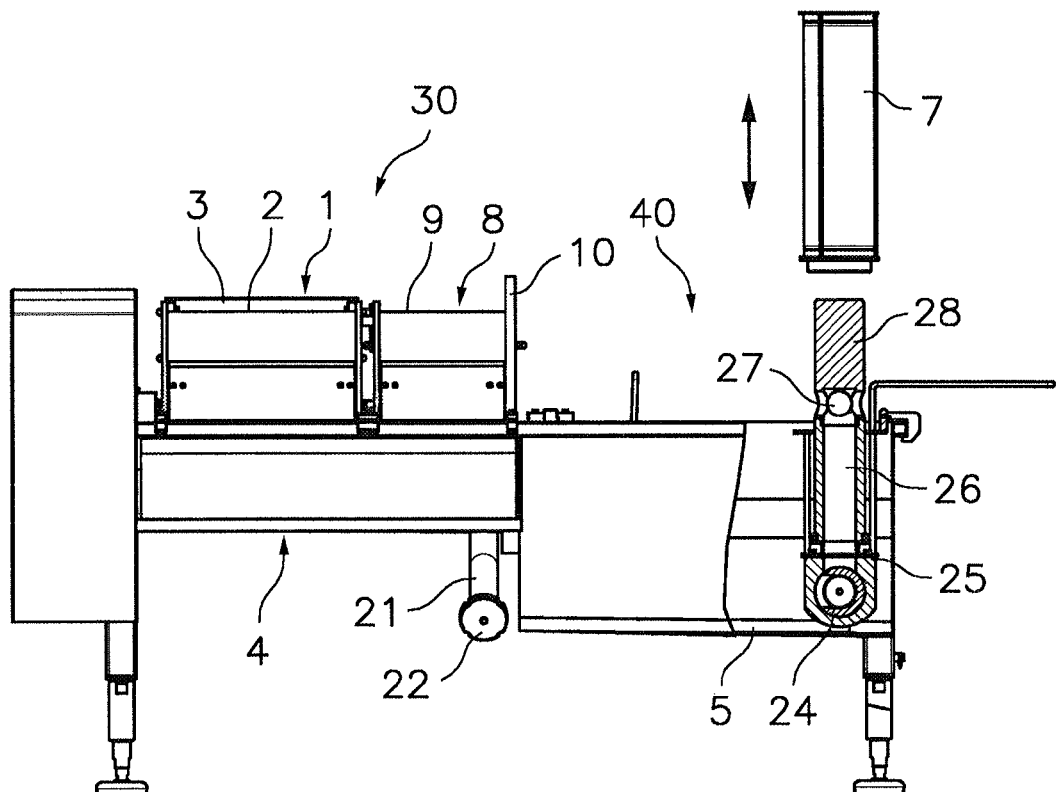
FIG. 3 is a partially sectioned side view of the device of FIG. 1 with a group of elements of the safety filtering unit shown in the cleaning and maintenance position and with a safety filter sleeve separated from the assembly.

With reference to FIGS. 1 and 3, according to the invention it is proposed that the safety filtering unit 40 comprises at least two safety filtering sleeves 7 connected to said outlet 6 through respective independent valve devices 24, each of which is operated by a pivoting movement of a support 25 on which the corresponding safety filter sleeve 7 is assembled between a working position, in which the safety filter sleeve 7 is submerged in the brine in the tank 5 and the corresponding valve device 24 is open, and a cleaning and maintenance position, in which the safety filter sleeve 7 is emerged from the brine of the tank 5 and the corresponding valve device 24 is closed.

As shown in FIG. 3, each support 25 is connected to a respective solid body 28 having the purpose of reducing the volume of brine inside the corresponding safety filter sleeve 7. The mentioned solid body 28 has one or more side inlets 27 which are communicated with an inner conduit 26 extending through the support 25. Thus, when each safety filter sleeve 7 is in the working position, it is communicated with the outlet 6 through the inner conduit 26 of the solid body and of the support 25.

The inlets 27 of the inner conduit 26 are located such that they are above the level of the brine in the tank 5 when the support 25 is in the cleaning and maintenance position (FIG. 3), thus allowing a complete extraction of the safety filter sleeve 7 by axially sliding it along the support 25 without the risk of the brine penetrating towards the valve device 24 when the support 25 is in the cleaning and maintenance position. The safety filter sleeve 7 is held by an interference coupling or the like to the support 25 next to its area of articulation adjacent to the valve 24.

Figure 2:
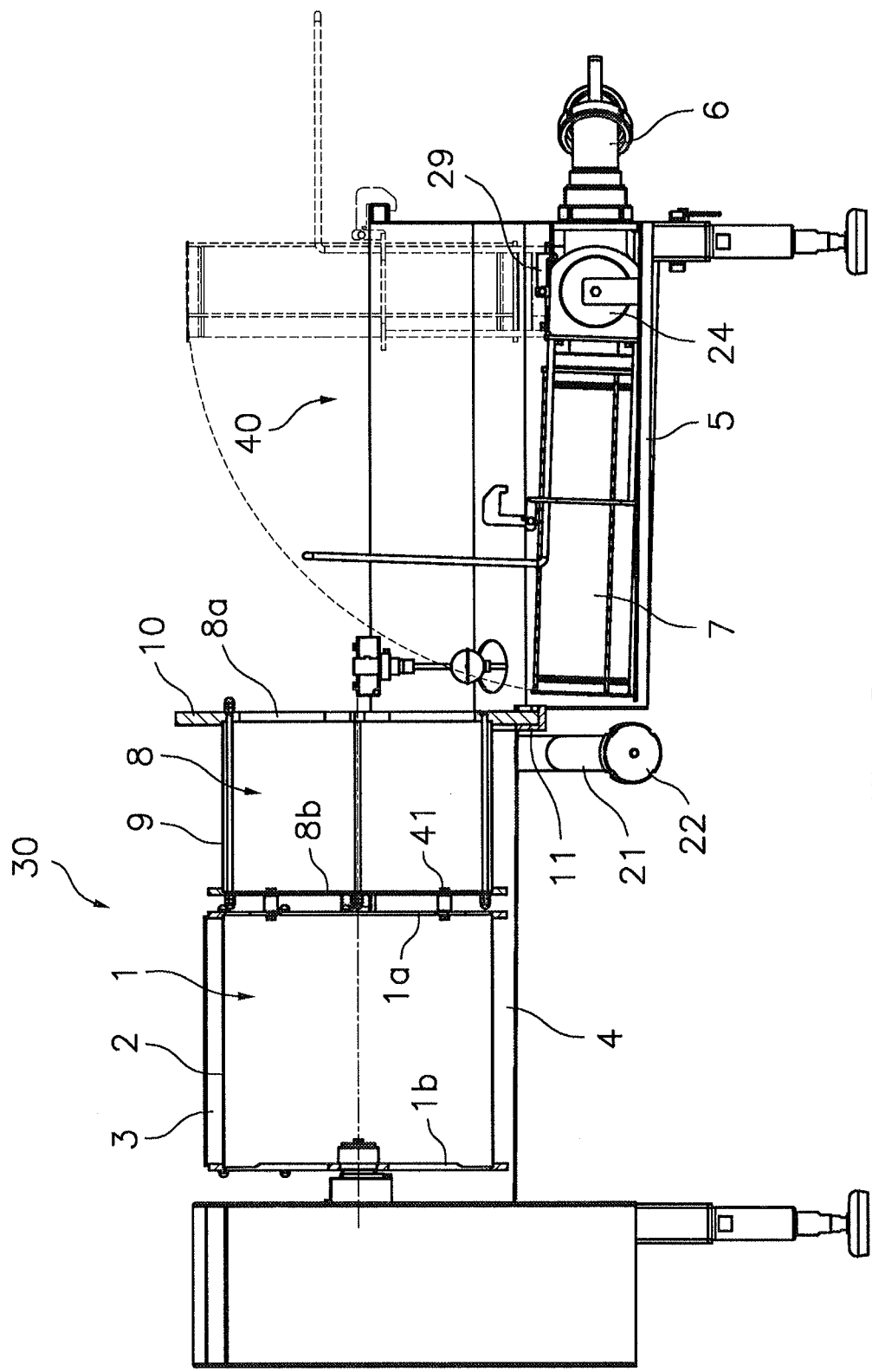
FIG. 2 is a cross-section view of the device of FIG. 1 with a group of elements of the safety filtering unit shown in the working position by means of solid lines and in a cleaning and maintenance position by means of dotted lines.
Figure 4:
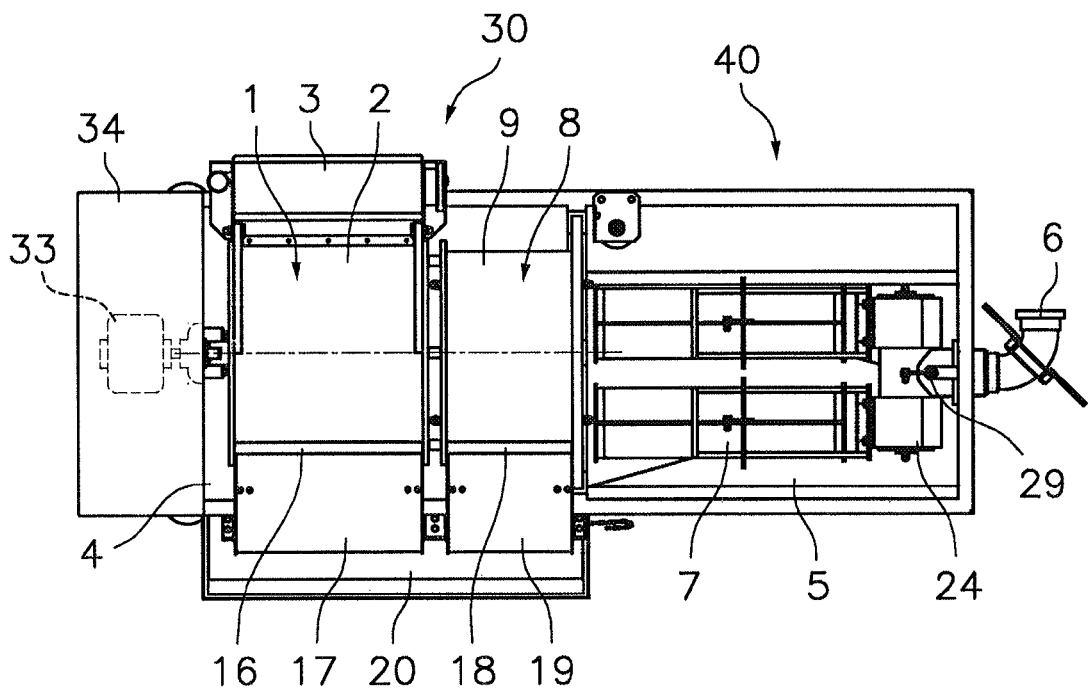
FIG. 4 is a plan view of the device of FIG. 1 with the elements of the safety filtering unit shown in the working position.
Figure 6:
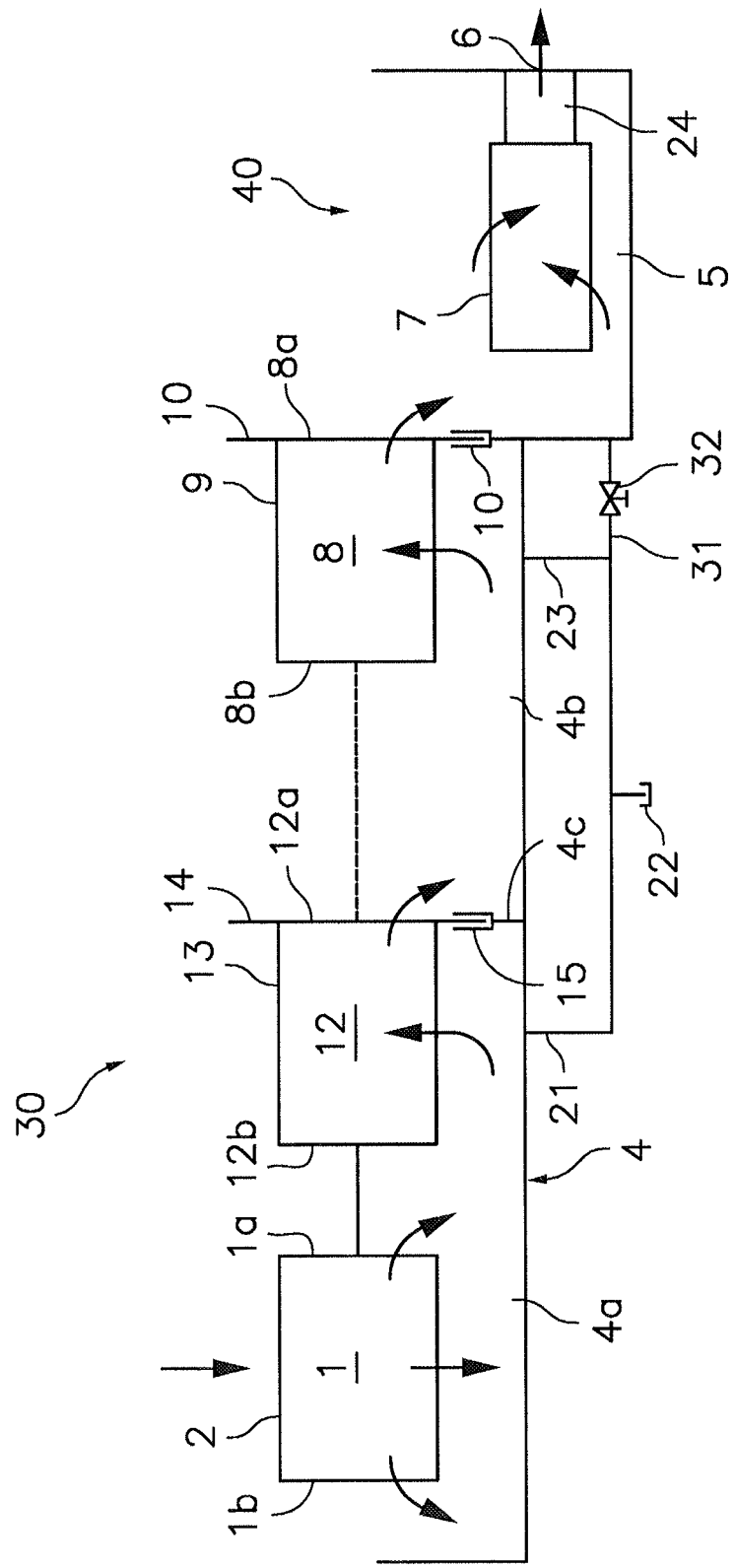
FIG. 6 is a schematic diagram illustrating the passage of the brine to be filtered through the series of pre-filtration drums of the pre-filtering unit and of the safety filtering sleeves in the safety filtering unit.

The valve device 24 has a base body which is retained in the operative situation inside the tank 5 by a slot and a latch 29 (FIGS. 2, 4 and 6). Thus the complete assembly formed by the valve device 24, the supports 25, the solid bodies 26 and optionally the safety filtering sleeves 7, can be removed from the tank 5 by manually releasing the latch 29 when the safety filtering sleeves 7 in the cleaning and maintenance position, by slightly moving the base body of the valve device 24 towards the pre-filtering unit 30 and vertically lifting the assembly, as shown in FIG. 1.

Figure 5:
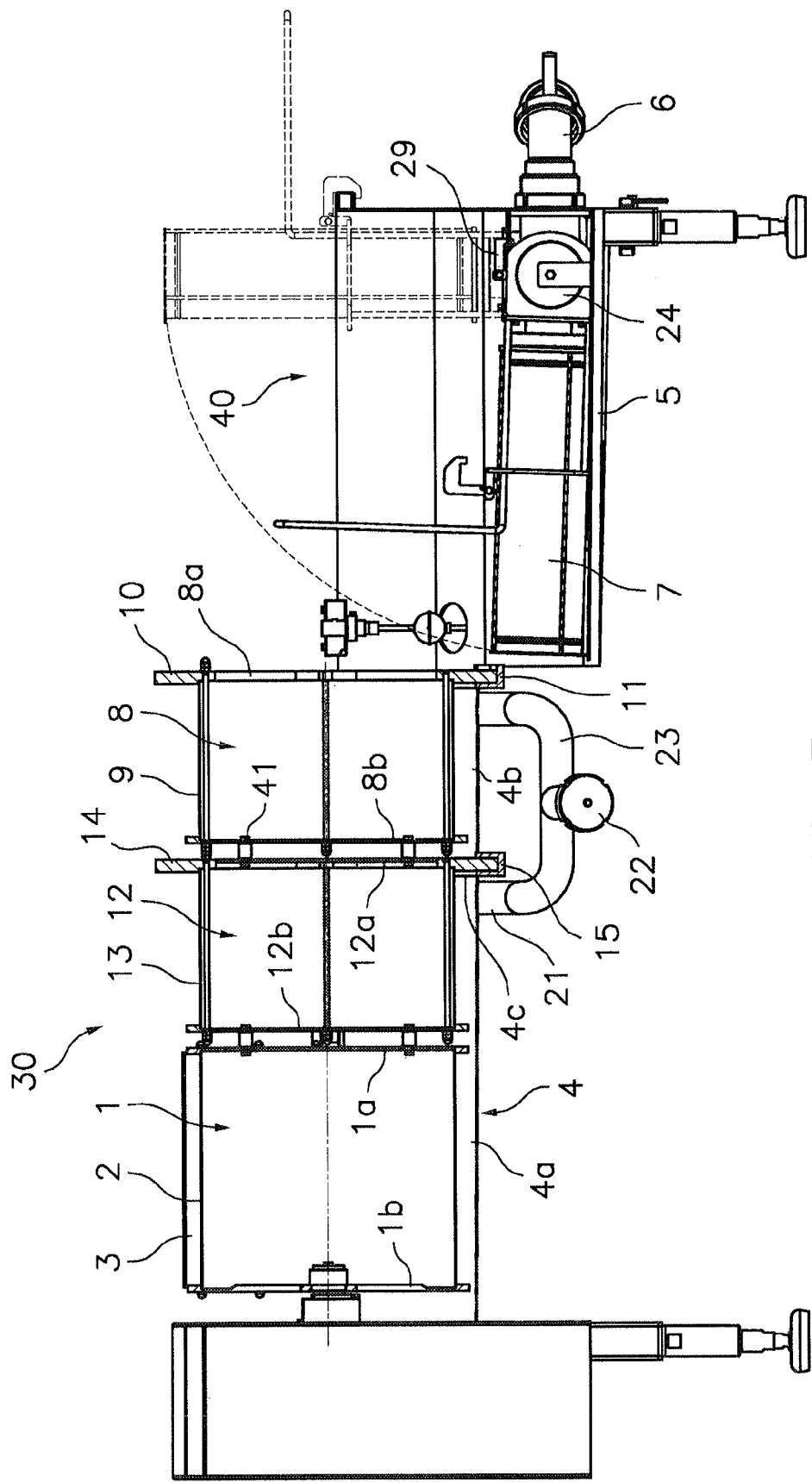
FIG. 5 is a cross-section view of a brine filtering device according to another embodiment of the present invention, with a group of elements of the safety filtering unit shown in a working position by means of solid lines and in a cleaning and maintenance position by means of dotted lines.

FIG. 5 shows an alternative embodiment in which the pre-filtering unit 30 comprises at least one additional pre-filtration drum 12 intermediate the first and second filtration drums 1, 8 and arranged to rotate coaxially together with the first and second filtration drums 1, 8. Said additional pre-filtration drum 12 is provided with an additional filtering wall 13 around the horizontal rotation axis.

This additional pre-filtration drum 12 has an additional filtering wall 13 arranged around the horizontal rotation axis, an additional closed side wall 12*b* adjacent the first pre-filtration drum 1, an open side wall 12*a* adjacent the second pre-filtration drum 8, and an additional perimetric flange 14 extending radially outwards from one end of the additional pre-filtration drum 12 adjacent to said additional open side wall 12*a* thereof. A lower region of the additional filtering wall 13 is located within the tub 4.

Although not shown, an additional scraper is arranged to scrape the outer surface of the additional filtering wall 13 of the additional pre-filtration drum 12 and an additional ramp is arranged to direct waste pulled off by said additional scraper to the collection tray 20.

A partition wall 4*c* perpendicular to the rotation axis is provided in the tub 4 between the additional pre-filtration drum 12 and the second pre-filtration drum 8. Said partition wall 4*c* divides the tub 4 into first and second compartments 4*a*, 4*b*, wherein the first pre-filtration drum 1 and the additional pre-filtration drum 12 are located in the first compartment 4*a* and the second pre-filtration drum 8 is located in the second compartment 4*b*.

The tub 4 has in a lower region thereof a first drainage outlet 21 in the first compartment 4*a* and a second drainage outlet 22 in the second compartment 4*b*. The first and second drainage outlets 21, 23 are connected therebetween and share a single drain plug 22, although alternatively they could be individually closed by respective drain plugs.

The partition wall 4*c* has an aperture communicating the first and second compartments 4*a*, 4*b*, and an additional curved channel 15 is provided along a curved edge of said communicating aperture. The additional curved channel 15 is coaxial with the horizontal rotation axis, and a lower region of said additional perimetric flange 14 of the additional pre-filtration drum 12 is inserted in the additional curved channel 15. The construction of the additional curved channel 15 is analogous to that of the curved channel 12 as described above with relation to FIGS. 11 and 12.

Friction between inner surfaces of the additional curved channel 15 and outer surfaces of the additional perimetric flange 14 provides dynamic seal between a region of the first compartment 4a of the tub 4 outside the additional filtering wall 13 of the additional pre-filtration drum 12 and the second compartment 4b of the tub 4, as well as a bearing for the joint rotation of the first, additional and second pre-filtration drums 1, 12, 8.

With this arrangement, pre-filtered brine coming from the first pre-filtration drum 1 and collected in the first compartment 4a of the tub 4 enters the additional pre-filtration drum 12 through a lower region of the additional filtering wall 13 thereof by hydrostatic pressure, and pre-filtered brine from the additional pre-filtration drum 12 is poured through the open side wall 12a thereof into the second compartment 4b of the tub 4.

FIG. 6 schematically shows, by means of arrows, the passage of the brine to be filtered through the filtering walls 2, 13, 9 of the successive pre-filtration drums 1, 12, 8 in the pre-filtering unit 30 according to the embodiment described in relation with FIG. 5, and through the safety filtering sleeves 7 of the safety filtering unit 40 of the filtration device of the present invention. A person skilled in the art will understand that an indefinite number of further additional pre-filtration drums can be added between the additional pre-filtration drum 12 and the second pre-filtration drum 8 using an arrangement similar to that described above for the additional pre-filtration drum 12.

Optionally, as diagrammatically shown in FIG. 6, the drainage outlets 21, 23 at the bottom of the first and second compartments 4a, 4b of the tub 4 are connected to the tank 5 of the safety filtering unit 40 by means of a drainage pipe 31 including a valve 32 operable for transferring a remaining amount of brine from the first and second compartments 4a, 4b of the tub 4 to the tank 5 by using the mentioned suction means provided to suck brine contained in the tank through the outlet 6. A similar arrangement can be used to transfer remaining brine from the tub 4 to the tank 5 if no additional pre-filtration drum is provided.

Figure 7:
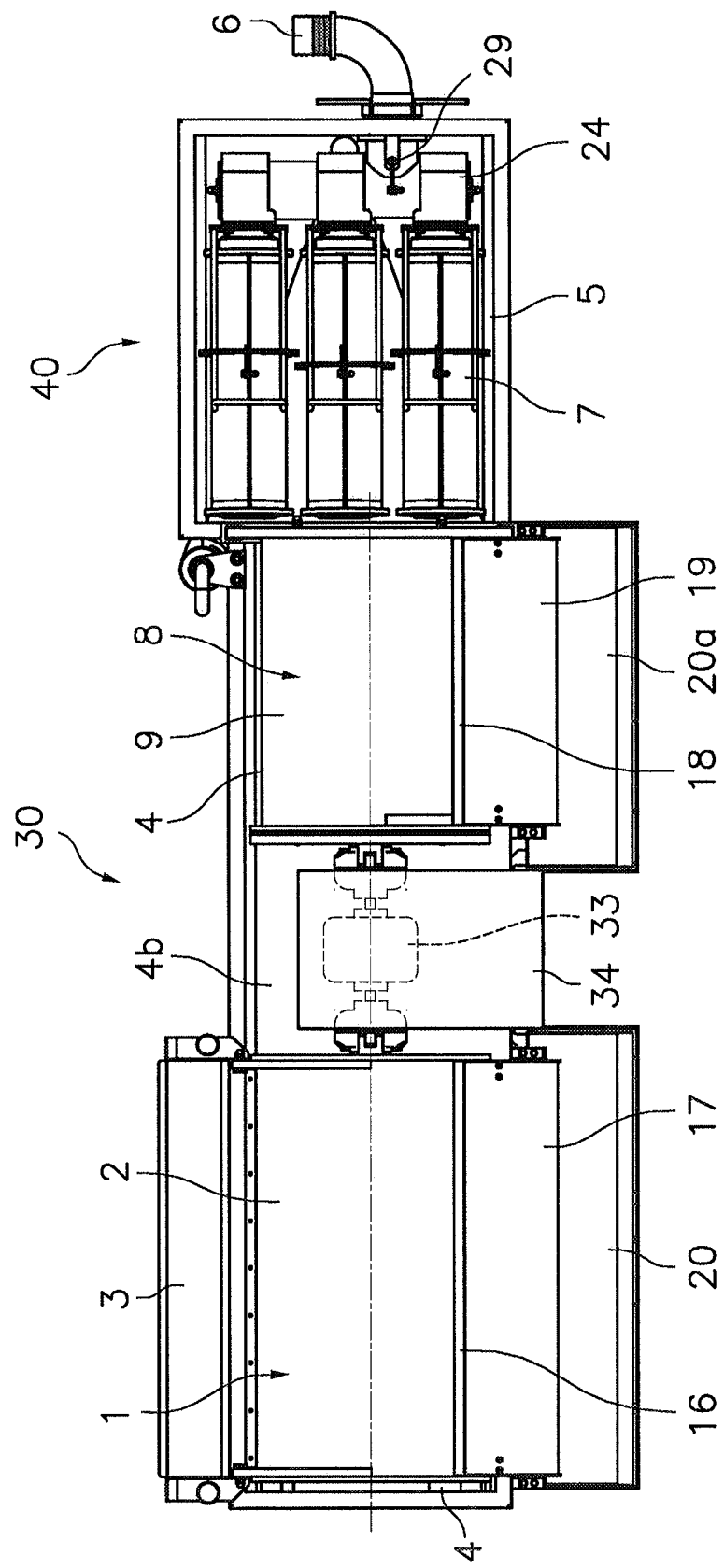
FIG. 7 is a plan view of a variant of the filtering device of FIG. 1 with the elements of the safety filtering unit shown in the working position.

FIG. 7 shows a variant of the embodiment of FIGS. 1 to 4 for greater productivity, in which the tub 4 defines a narrowing between a first portion of the tub 4 wherein the first pre-filtration drum 1 is located and a second portion of the tub 4 wherein the second pre-filtration drum 8 is located, and said first and second portions of the tub 4 are connected by a narrow tub portion 4b adjacent one side thereof. A motor 33 (schematically shown in dashed lines in FIG. 7) is arranged inside a protecting cabinet 34 which is located in a space between the first and second portions of the tub 4 provided by said narrowing of the tub 4. The motor 33 has an output shaft protruding from opposed ends thereof and operatively connected to drive both the first pre-filtration drum 1 and the second pre-filtration drum 8 for rotating together. Thus, a better transmission of the torque from the motor 33 to the first pre-filtration drum 1 and to the second pre-filtration drum 8, which are a bigger size in comparison with the embodiment of FIGS. 1 to 4, is provided.

The variant shown in FIG. 7 includes three safety filter sleeves 7 submerged in the tank 5. The rest of features are similar to those of the embodiment described above in relation to FIGS. 1 to 4.

Figure 8:
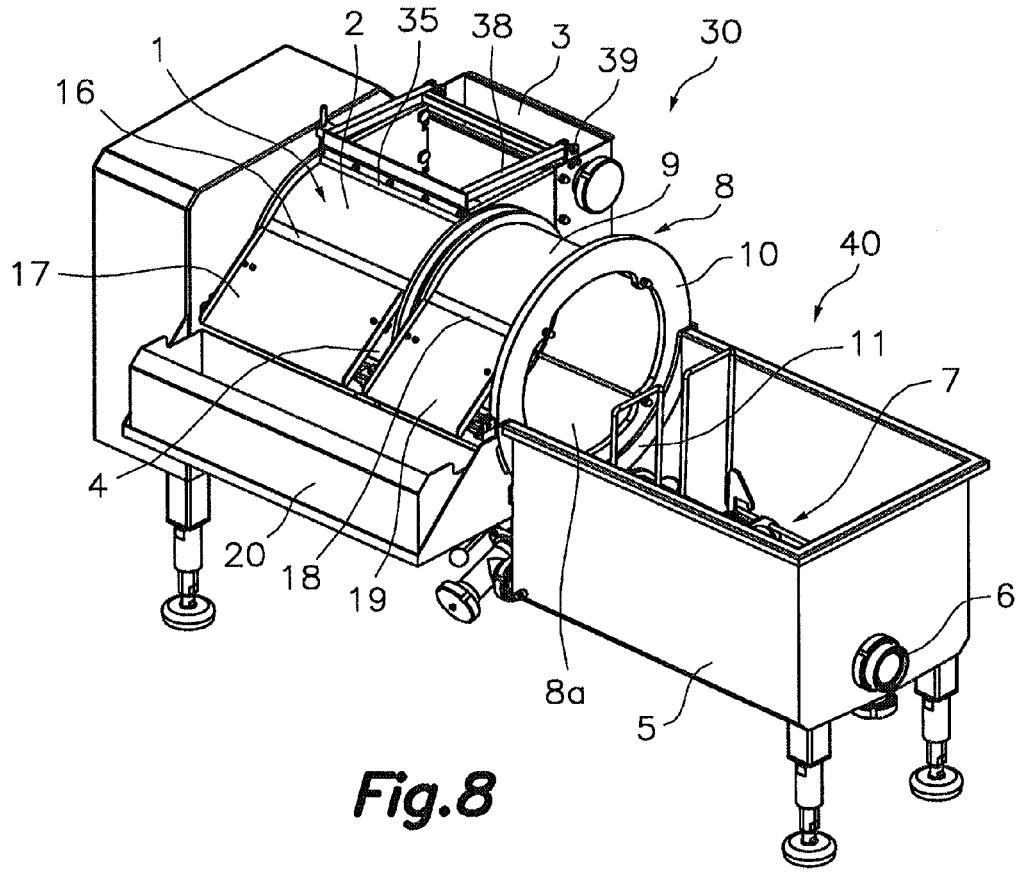
FIG. 8 is a perspective view of a brine filtering device according to another embodiment of the present invention.
Figures 9, 10:
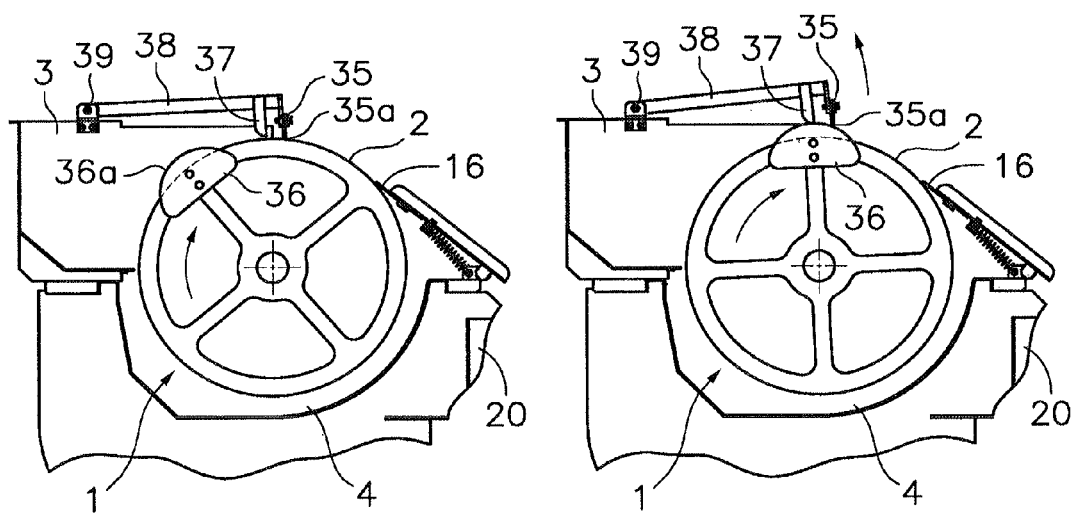
FIG. 9 is a partial schematic side view of the filtering device of FIG. 8 with a retaining element in a retaining position.
FIG. 10 is a partial schematic side view similar to FIG. 9 with the retaining element in a release position.

FIGS. 8 to 10 show a filtering device according to another embodiment of the present invention, which is analogous to that described above in relation to FIGS. 1 to 4 except in that here, the inlet hopper 3 is associated with a retaining member 35 having a contact edge 35a parallel to the rotation axis of the first pre-filtration drum 1 and positioned over the outer surface of the first filtering wall 2 of the first pre-filtration drum 1 at an upper region thereof upstream the first scraper 16 with respect to the rotation direction of the first pre-filtration drum 1. Said retaining member 35 is connected to a pivotable frame 38 arranged to freely pivot with respect to the inlet hopper 3 about a pivot axis 39 parallel to the rotation axis of the first pre-filtration drum 1 and spaced apart from the retaining element 35.

During rotation of the first pre-filtration drum 1, the pivotable frame 38 rests in a retaining position (FIG. 9), in which the contact edge of the retaining member 35 is supported by gravity on the outer surface of the first filtering wall 2 of the first pre-filtration drum 1, and is driven by a driving mechanism to intermittently pivot from said retaining position to a release position (FIG. 10) and again to the retaining position. In said release position, the retaining member 35 is out of contact with the first filtering wall 2 of the first pre-filtration drum 1. In the course of each turn, the time during which the retaining member 35 is in the retaining position is comparatively longer than the time during which the retaining member 35 is in the release position.

While the first pre-filtration drum 1 is rotating, the inlet hopper 3 is fed with brine to be filtered, and the pivotable frame 38 is in the retaining position (FIG. 9), the retaining member 35 momentarily retains and accumulates on the upper region of the first filtering wall 2 of the first pre-filtration drum 1 both waste, such as small pieces of meat and other undesired particles mixed with the brine being filtered, and components of brine, such as salt lumps, and lets time for said components of brine to dilute and pass through the first filtering wall 2 of the first pre-filtration drum 1 and return to the brine in the tub 4 while the waste remains momentarily retained by the retaining member 35.

Each time the driving mechanism cyclically raises the retaining member 35 to the release position (FIG. 10) for a relatively short time, the waste momentarily retained and accumulated by the retaining member 35 is moved by the first pre-filtration drum 1 and passes under the retaining member 35 to the first scraper 16 and to the collection tray 20. The waste disposed is substantially free of components of brine since the components of brine are already diluted and have passed through the first filtering wall 2 of the first pre-filtration drum 1. This leads to a more efficient use of the components of brine and provides a reduction in operation costs.

As shown in FIGS. 9 and 10, said driving mechanism comprises a cam element 36 attached to a side wall of the first pre-filtration drum 1 and a cam follower 37 attached to the pivotable frame 38 to which said retaining member 35 is attached. The cam element 36 has a rounded cam surface 36a that extends radially outwards from the path of the cam follower when the retaining member 35 is in the retaining position. Said rounded cam surface 36a of the cam element 36 extends a relatively short portion along the circumference of the first pre-filtration drum 1 so that during rotation of the first pre-filtration drum 1 the cam element 36 engages the cam follower 37 for a short portion of each turn and dos not engage the cam follower 37 during the rest of the turn. While the cam follower 37 is not engaged by the cam element 36 (FIG. 9), the pivotable frame 38 keeps the retaining member 35 in the retaining position with the contact edge 35a thereof supported on the first filtering wall 2 of the first pre-filtration drum 1 by gravity. When the cam follower 37 is engaged by the cam element 36, the pivotable frame 38 is pivoted up and the retaining member 35 is moved from the retaining position to the release position out of contact with the first filtering wall 2 of the first pre-filtration drum 1.

In a further embodiment (not shown), the driving mechanism comprises two or more cam elements 36 distributed at angular intervals along the circumference and attached to the side wall of the first pre-filtration drum 1 in addition to the cam follower 37 attached to the pivotable frame 38, so that the retaining member 35 is moved by the driving mechanism from the retaining position to the release position and again to the retaining position two or more times during each turn. A person skilled in the art will consider modifications and variations from the embodiments shown and described without departing from the scope of the present invention as it is defined in the attached claims.

The invention claimed is:

1. A brine filtering device, applicable to a meat product injection machine, comprising a pre-filtering unit and a safety filtering unit, said pre-filtering unit comprising:
a tub;
a first pre-filtration drum and a second pre-filtration drum coaxially arranged to rotate together about a common horizontal rotation axis;
the first pre-filtration drum having a first filtering wall arranged around said common horizontal rotation axis and opposite side walls, at least one of said side walls of the first pre-filtration drum being an open side wall;
the second pre-filtration drum having a second filtering wall arranged around the common horizontal rotation axis, a closed side wall adjacent and facing said open side wall of the first pre-filtration drum, an opposite open side wall adjacent said safety filtering unit, and a perimetric flange extending radially outwards from one end of the second pre-filtration drum adjacent to said open side wall;
a lower region of said first filtering wall and a lower region of said second filtering wall being located below said common horizontal rotation axis within said tub and for submersion in brine contained in the tub, the brine defining a brine level in the tub;
a curved channel coaxial with the common horizontal rotation axis and located at one end of the tub, said curved channel having opposite ends located above the brine level and an intermediate region located below the brine level;
a lower region of said perimetric flange of the second pre-filtration drum is located in the curved channel,
wherein a friction fit between outer surfaces of the perimetric flange and inner surfaces of the curved channel form a seal therebetween;
an inlet hopper located on an upper region of the first pre-filtration drum, said inlet hopper adapted to receive brine to be filtered and forcing by gravity the brine to be filtered into the first pre-filtration drum through the first filtering wall,
wherein brine pre-filtered by the first pre-filtration drum is collected in the tub, brine in the tub entering the second pre-filtration drum only through said submerged lower region of the second filtering wall by hydrostatic pressure;
a first scraper arranged to scrape an outer surface located outside the tub of the first filtering wall of the first pre-filtration drum and a second scraper arranged to scrape an outer surface located outside the tub of the second filtering wall of the second pre-filtration drum;
said safety filtering unit comprising:
a tank having a side wall attached to said end of the tub closed by the curved channel and the perimetric flange, said tank being in communication with the tub through the open side wall of the second pre-filtration drum, wherein brine in the second pre-filtration drum flows into the tank through only the open side wall of the second pre-filtration drum and over said intermediate region of the curved channel; and
at least one safety filter sleeve located in said tank and connected to an outlet of the tank.

2. The device according to claim 1, wherein said inlet hopper is associated with a retaining member having a contact edge parallel to the common horizontal rotation axis and positioned over an outer surface of the first filtering wall of the first pre-filtration drum at an upper region thereof, and wherein, in a retaining position, said retaining member is in contact with the outer surface of the first filtering wall of the first pre-filtration drum and retains and accumulates both waste and components of brine on said upper region of the first filtering wall of the first pre-filtration drum, and lets time for said components of brine to dilute and pass through the first filtering wall of the first pre-filtration drum.

3. The device according to claim 2, wherein said retaining member is intermittently moved by a driving mechanism from said retaining position to a release position, in which the retaining member is out of contact with the first filtering wall, and again to the retaining position, wherein, in said release position, the retaining member lets the waste previously accumulated by the retaining member on the outer surface of the first filtering wall of the first pre-filtration drum to be moved by the first pre-filtration drum to said first scraper.

4. The device according to claim 2, wherein the retaining member is connected to a pivotable frame arranged to freely pivot with respect to the inlet hopper about a pivot axis parallel to the common horizontal rotation axis of the first pre-filtration drum and spaced apart from the retaining element, said pivotable frame being pivoted by said driving mechanism.

5. The device according to claim 4, wherein said driving mechanism comprises a cam element attached to one of said side walls of the first pre-filtration drum and a cam follower attached to said pivotable frame, said cam element engaging said cam follower for intermittently pivoting the pivotable frame and thereby moving the retaining member between the retaining position and the release position during rotation of the first pre-filtration drum.

6. The device according to claim 1, wherein the curved channel provides a bearing for the joint rotation of the first and second pre-filtration drums.

7. The device according to claim 1, wherein suction means are connected to said outlet of the tank for sucking filtered brine from the safety filter sleeve.

8. The device according to claim 1, wherein a first ramp is arranged to direct waste pulled off by said first scraper to a collection tray and a second ramp is arranged to direct waste pulled off by said second scraper to said collection tray.

9. The device according to claim 1, wherein the pre-filtering unit comprises at least one additional pre-filtration drum intermediate the first and second pre-filtration drums and arranged to rotate therewith, said additional pre-filtration drum having an additional filtering wall arranged around the common horizontal rotation axis, an additional closed side wall adjacent the first pre-filtration drum, an additional open side wall adjacent the second pre-filtration drum, and an additional perimetric flange extending radially outwards from one end of the additional pre-filtration drum adjacent to said additional open side wall thereof, at least a lower region of said additional filtering wall being located within the tub and submerged in the brine contained in the tub, an additional curved channel dividing the tub into first and second compartments, said additional curved channel having opposite ends located at an upper level than the level of brine in the first compartment of the tub and an intermediate region located at a lower level than the level of brine in the first compartment of the tub, a lower region of said additional perimetric flange of the additional pre-filtration drum being fitted in the curved channel, friction between outer surfaces of the perimetric flange and inner surfaces of the curved channel providing a seal either when the additional pre-filtration drum is stopped and when the additional pre-filtration drum rotates, the first and second compartments of the tub being communicated through the additional open side wall of the additional pre-filtration drum.

10. The device according to claim 9, characterized in that an additional scraper is arranged to scrape an outer surface of the additional filtering wall of the additional pre-filtration drum and an additional ramp is arranged to direct waste pulled off by said additional scraper to the collection tray.

11. The device according to claim 10, wherein the additional curved channel provides a bearing for the joint rotation of the first, additional and second pre-filtration drums.

12. The device according to claim 1, wherein the tub has in a lower region thereof a drainage outlet closed by a removable drain plug.

13. The device according to claim 9, wherein the tub has in a lower region thereof at least a first drainage outlet in the first compartment and at least one second drainage outlet in the second compartment, said at least one first drainage outlet and said at least one second drainage outlet being closed by respective removable drain plugs.

14. A brine filtering device, applicable to a meat product injection machine, comprising a pre-filtering unit and a safety filtering unit, said pre-filtering unit comprising:
  a tub;
  a first pre-filtration drum and a second pre-filtration drum coaxially arranged to rotate together about a common horizontal rotation axis;
  the first pre-filtration drum having a first filtering wall arranged around said common horizontal rotation axis and opposite side walls, at least one of said side walls being an open side wall;
  the second pre-filtration drum having a second filtering wall arranged around the common horizontal rotation axis, a closed side wall adjacent and facing said open side wall of the first pre-filtration drum, an opposite open side wall adjacent said safety filtering unit, and a perimetric flange extending radially outwards from one end of the second pre-filtration drum adjacent to said open side wall;
  a lower region of said first filtering wall and a lower region of said second filtering wall being located below said common horizontal rotation axis within said tub and for submersion in brine contained in the tub, the brine defining a brine level in the tub;
  a curved channel closing one end of the tub, said curved channel having opposite ends located above the brine level and an intermediate region located below the brine level;
  a lower region of said perimetric flange of the second pre-filtration drum is located in the curved channel, wherein a friction fit between outer surfaces of the perimetric flange and inner surfaces of the curved channel forms a seal therebetween;
  an inlet hopper located on an upper region of the first pre-filtration drum, said inlet hopper adapted to receive brine to be filtered and forcing by gravity the brine to be filtered into the first pre-filtration drum through the first filtering wall;
  wherein brine pre-filtered by the first pre-filtration drum is collected in the tub, brine in the tub entering the second pre-filtration drum only through said submerged lower region of the second filtering wall by hydrostatic pressure;
  said inlet hopper is associated with a retaining member having a contact edge parallel to the rotation axis and positioned over an outer surface of the first filtering wall of the first pre-filtration drum at an upper region thereof, wherein, in a retaining position, said retaining member is in contact with the outer surface of the first filtering wall of the first pre-filtration drum and retains and accumulates both waste and components of brine on said upper region of the first filtering wall of the first pre-filtration drum, and lets time for said components of brine to dilute and pass through the first filtering wall of the first pre-filtration drum,
  a first scraper arranged to scrape an outer surface located outside the tub of the first filtering wall of the first pre-filtration drum and a second scraper arranged to scrape an outer surface located outside the tub of the second filtering wall of the second pre-filtration drum;
  said safety filtering unit comprising:
  a tank having a side wall attached to said end of the tub closed by the curved channel, said tank being in communication with the tub through the open side wall of the second pre-filtration drum; and
  at least one safety filter sleeve located in said tank and connected to an outlet of the tank,
  wherein said retaining member is intermittently moved by a driving mechanism from said retaining position to a release position, in which the retaining member is out of contact with the first filtering wall, and again to the retaining position, wherein, in said release position, the retaining member lets waste previously accumulated by the retaining member on the outer surface of the first filtering wall of the first pre-filtration drum to be moved by the first pre-filtration drum to said first scraper.

15. The device according to claim 14, wherein the retaining member is connected to a pivotable frame arranged to freely pivot with respect to the inlet hopper about a pivot axis parallel to the common horizontal rotation axis of the first pre-filtration drum and spaced apart from the retaining element, said pivotable frame being pivoted by said driving mechanism.

16. The device according to claim 15, characterized in that said driving mechanism comprises a cam element attached to a side wall of the first pre-filtration drum and a cam follower attached to said pivotable frame, said cam element engaging said cam follower for intermittently pivoting the pivotable frame and thereby moving the retaining member between the retaining position and the release position during rotation of the first pre-filtration drum.

17. The device according to claim 14, wherein the curved channel provides a bearing for the joint rotation of the first and second pre-filtration drums.

18. A brine filtering device, applicable to a meat product injection machine, comprising a pre-filtering unit and a safety filtering unit, said pre-filtering unit comprising:
  a tub;

a first pre-filtration drum and a second pre-filtration drum coaxially arranged to rotate together about a common horizontal rotation axis;

the first pre-filtration drum having a first filtering wall arranged around said common horizontal rotation axis and opposite side walls, at least one of said side walls of the first pre-filtration drum being an open side wall;

the second pre-filtration drum having a second filtering wall arranged around the common horizontal rotation axis, a closed side wall adjacent and facing said open side wall of the first pre-filtration drum, an opposite open side wall adjacent said safety filtering unit, and a perimetric flange extending radially outwards from one end of the second pre-filtration drum adjacent to said open side wall;

a lower region of said first filtering wall and a lower region of said second filtering wall being located below said common horizontal rotation axis within said tub and for submersion in brine contained in the tub, the brine defining a brine level in the tub;

a curved channel coaxial with the common horizontal rotation axis and located at one end of the tub, said curved channel having opposite ends located above the brine level and an intermediate region located below the brine level;

a lower region of said perimetric flange of the second pre-filtration drum being is located in the curved channel, wherein a friction fit between outer surfaces of the perimetric flange and inner surfaces of the curved channel form a seal therebetween;

an inlet hopper located on an upper region of the first pre-filtration drum, said inlet hopper adapted to receive brine to be filtered and forcing by gravity the brine to be filtered into the first pre-filtration drum through the first filtering wall, wherein brine pre-filtered by the first pre-filtration drum is collected in the tub, brine in the tub entering the second pre-filtration drum only through said submerged lower region of the second filtering wall by hydrostatic pressure;

a first scraper arranged to scrape an outer surface located outside the tub of the first filtering wall of the first pre-filtration drum and a second scraper arranged to scrape an outer surface located outside the tub of the second filtering wall of the second pre-filtration drum;

a retaining member arranged to skim the outer surface of the first filtering wall of the first pre-filtration drum at an upper region thereof;

a driving mechanism to intermittently move said retaining member out of contact with the first filtering wall to let the first pre-filtration drum move waste accumulated by the retaining member to said first scraper;

said safety filtering unit comprising:

a tank having a side wall attached to said end of the tub closed by the curved channel and the perimetric flange, said tank being in communication with the tub through the open side wall of the second pre-filtration drum, wherein brine in the second pre-filtration drum flows into the tank through only the open side wall of the second pre-filtration drum and over said intermediate region of the curved channel; and at least one safety filter sleeve located in said tank and connected to an outlet of the tank.

19. A brine filtering device, applicable to a meat product injection machine, comprising a pre-filtering unit and a safety filtering unit, said pre-filtering unit comprising:

a tub;

a first pre-filtration drum and a second pre-filtration drum coaxially arranged to rotate together about a common horizontal rotation axis;

the first pre-filtration drum having a first filtering wall arranged around said common horizontal rotation axis and opposite side walls, at least one of said side walls of the first pre-filtration drum being an open side wall;

the second pre-filtration drum having a second filtering wall arranged around the common horizontal rotation axis, a closed side wall adjacent and facing said open side wall of the first pre-filtration drum, an opposite open side wall adjacent said safety filtering unit, and a perimetric flange extending radially outwards from one end of the second pre-filtration drum adjacent to said open side wall;

a lower region of said first filtering wall and a lower region of said second filtering wall being located below said common horizontal rotation axis within said tub and for submersion in brine contained in the tub, the brine defining a brine level in the tub;

a curved channel having a U shaped cross section, coaxial with the common horizontal rotation axis and located at one end of the tub, said curved channel having opposite ends located above the brine level and an intermediate region located below the brine level;

a lower region of said perimetric flange of the second pre-filtration drum is located in the curved channel, wherein a friction fit between outer surfaces of the perimetric flange and inner surfaces of the curved channel form a seal therebetween;

an inlet hopper located on an upper region of the first pre-filtration drum, said inlet hopper adapted to receive brine to be filtered and forcing by gravity the brine to be filtered into the first pre-filtration drum through the first filtering wall, wherein brine pre-filtered by the first pre-filtration drum is collected in the tub, brine in the tub entering the second pre-filtration drum only through said submerged lower region of the second filtering wall by hydrostatic pressure;

a first scraper arranged to scrape an outer surface located outside the tub of the first filtering wall of the first pre-filtration drum and a second scraper arranged to scrape an outer surface located outside the tub of the second filtering wall of the second pre-filtration drum;

said safety filtering unit comprising:

a tank having a side wall attached to said end of the tub closed by the curved channel and the perimetric flange, said tank being in communication with the tub through the open side wall of the second pre-filtration drum, wherein brine in the second pre-filtration drum flows into the tank through only the open side wall of the second pre-filtration drum and over said intermediate region of the curved channel; and at least one safety filter sleeve located in said tank and connected to an outlet of the tank.

\* \* \* \* \*